(12) United States Patent
Nakayama

(10) Patent No.: US 10,720,639 B2
(45) Date of Patent: Jul. 21, 2020

(54) POSITIVE ELECTRODE MATERIAL FOR NONAQUEOUS ELECTROLYTE SECONDARY BATTERY AND MANUFACTURING METHOD THEREOF

(71) Applicant: TOYOTA JIDOSHA KABUSHIKI KAISHA, Toyota-shi, Aichi (JP)

(72) Inventor: Tetsuri Nakayama, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 326 days.

(21) Appl. No.: 15/226,282

(22) Filed: Aug. 2, 2016

(65) Prior Publication Data

US 2017/0040600 A1 Feb. 9, 2017

(30) Foreign Application Priority Data

Aug. 7, 2015 (JP) .................. 2015-157748

(51) Int. Cl.
*H01M 4/36* (2006.01)
*H01M 4/38* (2006.01)
(Continued)

(52) U.S. Cl.
CPC ............ *H01M 4/366* (2013.01); *C01G 53/50* (2013.01); *H01M 4/483* (2013.01); *H01M 4/505* (2013.01); *H01M 4/525* (2013.01); *C01P 2002/50* (2013.01); *C01P 2002/52* (2013.01); *C01P 2004/34* (2013.01); *C01P 2004/80* (2013.01); *C01P 2006/12* (2013.01); *H01M 10/052* (2013.01); *H01M 2004/021* (2013.01); *H01M 2004/028* (2013.01); *H01M 2220/20* (2013.01); *Y02E 60/122* (2013.01); *Y02P 70/54* (2015.11)

(58) Field of Classification Search
CPC ....... H01M 4/366; H01M 4/505; H01M 4/525
See application file for complete search history.

(56) References Cited

U.S. PATENT DOCUMENTS 6,150,053 A 11/2000 Murata et al.
2005/0227147 A1 10/2005 Kogetsu et al.
(Continued)

FOREIGN PATENT DOCUMENTS

CN 102971893 A 3/2013
JP 11-040200 A 2/1999
(Continued)

OTHER PUBLICATIONS

Notification of Reasons for Refusal in corresponding Japanese Patent Application No. JP 2015-157748 dated Dec. 15, 2017; 6 pages in Japanese and English.
(Continued)

*Primary Examiner* — Stephan J Essex
(74) *Attorney, Agent, or Firm* — Sughrue Mion, PLLC

(57) ABSTRACT

Provided is a positive electrode material for a nonaqueous electrolyte secondary battery that excels in thermal stability. A positive electrode material for a nonaqueous electrolyte secondary battery, which is provided by the present invention, includes positive electrode active material particles that can reversibly store and release a charge carrier, and a metal hydroxide. Each of the positive electrode active material particles has inside thereof a void and the metal hydroxide is disposed inside the void.

6 Claims, 6 Drawing Sheets

(51) Int. Cl.
*H01M 4/505* (2010.01)
*H01M 4/525* (2010.01)
*C01G 53/00* (2006.01)
*H01M 4/48* (2010.01)
*H01M 10/052* (2010.01)
*H01M 4/02* (2006.01)

(56) References Cited

U.S. PATENT DOCUMENTS

| | | | |
|---|---|---|---|
| 2007/0298322 A1* | 12/2007 | Yamamoto | H01M 4/628 429/218.1 |
| 2012/0282525 A1 | 11/2012 | Nagai et al. | |
| 2014/0050976 A1* | 2/2014 | Nagai | H01M 4/131 429/211 |
| 2014/0335417 A1 | 11/2014 | Nagai | |

FOREIGN PATENT DOCUMENTS

| | | | | |
|---|---|---|---|---|
| JP | 11-191417 A | | 7/1999 | |
| JP | 2005-322616 A | | 11/2005 | |
| JP | 2006083058 A | * | 3/2006 | ............ C01G 53/006 |
| JP | 2011-119092 A | | 6/2011 | |
| JP | 2013-118156 A | | 6/2013 | |
| JP | 2013-134871 A | | 7/2013 | |
| JP | 2014-63594 A | | 4/2014 | |
| JP | 2014063594 A | * | 4/2014 | |
| KR | 1020130043117 A | | 4/2013 | |
| WO | WO-2012153379 A1 | * | 11/2012 | ............ H01M 4/131 |

OTHER PUBLICATIONS

Y.-J. Kang et al., "The effect of $Al(OH)_3$ coating on the $Li[Li_{0.2}Ni_{0.2}Mn_{0.6}]O_2$ cathode material for lithium secondary battery", Electrochimica Acta 50, 2005, pp. 4784-4791.

\* cited by examiner

POSITIVE ELECTRODE MATERIAL FOR NONAQUEOUS ELECTROLYTE SECONDARY BATTERY AND MANUFACTURING METHOD THEREOF

BACKGROUND OF THE INVENTION

1. Field of the Invention

The present invention relates to a positive electrode material for a nonaqueous electrolyte secondary battery, and to a manufacturing method thereof.

The present application claims priority to Japanese Patent Application No. 2015-157748 filed on Aug. 7, 2015, the entire contents of which are hereby incorporated by reference.

2. Description of the Related Art

Nonaqueous electrolyte secondary batteries such as lithium secondary batteries (lithium ion secondary batteries) have recently found use as the so-called portable power sources for personal computers and portable terminals, and as drive power sources for vehicles. In particular, lightweight lithium secondary batteries (lithium ion secondary batteries), which make it possible to obtain a high energy density, have been advantageously used as high-output drive power sources for vehicles such as electric vehicles and hybrid vehicles.

SUMMARY OF THE INVENTION

However, the nonaqueous electrolyte secondary batteries generate heat during charging and discharging, and thereby the battery temperature can rise. For example, a positive electrode can generate heat during discharging. Furthermore, rapid increase in battery temperature can be caused by an internal short circuit, or the like.

Where the battery temperature rises, battery performance can be thereafter greatly degraded. Therefore, techniques for preventing the battery temperature from rising high and for increasing thermal stability have been desired. For example, Japanese Patent Application Publication No. 2014-063594 (JP-A 2014-063594) discloses the technique for suppressing heat generation in a positive electrode by allowing a positive electrode active material layer to include a compound having a heat absorption initiation temperature from 200° C. to 400° C.

Heat generation in a positive electrode active material layer is most often caused by the increase in temperature of the positive electrode active material. Therefore, with the technique disclosed in JP-A 2014-063594, although the increase in battery temperature can be effectively suppressed when the compound having a heat absorption initiation temperature from 200° C. to 400° C. is disposed close to the positive electrode active material, with some arrangements of the compounds in the positive electrode active material layer, the temperature increase suppression effect cannot be sufficiently demonstrated. Further, with the technique disclosed in JP-A 2014-063594, the compound inhibits the formation of conduction paths by the positive electrode active material, and the resistance can locally rise due to the presence of the compound.

With the foregoing in view, it is the main objective of the present invention to provide a positive electrode material that excels in thermal stability.

To attain the above-mentioned objective, the present invention provides a positive electrode material for use in a nonaqueous electrolyte secondary battery, including positive electrode active material particles that can reversibly store and release a charge carrier; and a metal hydroxide. Each of the positive electrode active material particles has inside thereof a void, and the metal hydroxide is disposed inside the void.

Metal hydroxides are known to absorb heat during thermal decomposition. Therefore, the positive electrode material disclosed herein can effectively suppress the increase in temperature of the positive electrode active material by the endothermic reaction of the metal hydroxide. In particular, since the positive electrode material has the metal hydroxide inside the voids of the positive electrode active material particles, the positive electrode active material and metal hydroxide are disposed adjacently. As a result, the heat generated by the positive electrode active material can be effectively absorbed by the metal hydroxide. Thus, the positive electrode material disclosed herein demonstrates a strong thermal stability increasing effect, and by using the positive electrode material to construct a battery, it is possible to prevent the battery temperature from rising and the battery from reaching a high temperature state.

As a result of arranging the metal hydroxide inside the voids of the positive electrode active material particles, it is possible to reduce the increase in battery resistance caused by the metal hydroxide which inhibits conduction paths from being formed by the positive electrode active material particles.

Therefore, the present invention can provide a nonaqueous electrolyte secondary battery including a positive electrode having a positive electrode active material layer including any of the positive electrode materials disclosed herein, and a negative electrode. Such a nonaqueous electrolyte secondary battery excels in thermal stability.

In a preferred embodiment of the positive electrode material disclosed herein, each of the positive electrode active material particles has a hollow structure having a shell configured of primary particles and a hollow portion formed inside thereof; and the metal hydroxide is disposed in the hollow portion.

With the positive electrode active material particles having a hollow structure, it is possible to ensure a large space (a void with a large volume) inside each of the positive electrode active material particles. Therefore, positive electrode active material particles having a hollow structure are advantageous for arranging a metal hydroxide inside the particles. Further, in the positive electrode material with the configuration in which the positive electrode active material particles have a hollow structure, conduction paths can be advantageously formed between the positive electrode active material particles, and the increase in battery resistance of the battery constructed using the positive electrode material can be greatly suppressed.

In a preferred embodiment of the positive electrode material disclosed herein, the metal hydroxide is included in the positive electrode material in an amount from 0.1 part by mass to 5 parts by mass per 100 parts by mass of the positive electrode active material particles.

Where the amount of the metal hydroxide in the positive electrode material (that is, the amount of the metal hydroxide with respect to the positive electrode active material particles) is within the abovementioned range, the thermal stability increasing effect can be demonstrated at a high level, while maintaining the amount of the positive electrode active material particles in the positive electrode materials.

Further, in a preferred embodiment of the positive electrode material disclosed herein, aluminum hydroxide is included as the metal hydroxide.

Aluminum hydroxide can induce an active endothermic reaction during thermal decomposition. Therefore, with the positive electrode material of such a configuration, the endothermic reaction of aluminum hydroxide can prevent the temperature of the positive electrode active material from rising high.

Further, in a preferred embodiment of the positive electrode material disclosed herein, the positive electrode active material is a lithium transition metal oxide including at least nickel, cobalt, and manganese.

Such a lithium transition metal oxide can be advantageously used as a positive electrode active material of a lithium secondary battery. Further, since such a lithium transition metal oxide has excellent stability of crystal structure and high thermal stability, it can be advantageously used in the nonaqueous electrolyte secondary battery disclosed herein.

Another aspect of the present invention resides in a method for manufacturing any of the positive electrode materials disclosed herein, the method including the following steps (i) to (iv).

Thus, the method for manufacturing the positive electrode material includes:

(i) preparing positive electrode active material particles that can reversibly store and release a charge carrier, each of the positive electrode material particles having a void inside the particle;

(ii) mixing the positive electrode active material particles with a predetermined metal salt;

(iii) reducing the predetermined metal salt and generating a hydroxide of the metal by inducing a redox reaction by using moisture in air or added moisture, and disposing the metal hydroxide at least inside the voids of the positive electrode active material particles; and (iv) removing excess moisture by drying the positive electrode active material particles in which the metal hydroxide has been disposed in the voids.

As indicated hereinabove, a positive electrode material in which a metal hydroxide is disposed inside the voids (for example, inside hollow portions) of the positive electrode active material particles can be adequately manufactured by mixing the positive electrode active material particles with a predetermined metal salt (typically, the salt of the metal element constituting the metal hydroxide), and then generating the metal hydroxide by reducing the predetermined metal salt with moisture contained in the air or by using added moisture.

DESCRIPTION OF THE PREFERRED EMBODIMENTS

Figure 1:
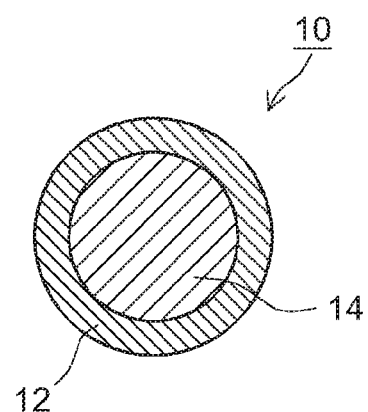
FIG. 1 is a cross-sectional view illustrating schematically the configuration of the positive electrode material according to an embodiment.

A preferable embodiment of the present invention will be explained hereinbelow in greater detail with reference to the appended drawings. It should be noted that matters necessary for carrying out the present invention other than those specifically referred to in the description are understood to be matters of design for a person skilled in the art which are based on the related art in the pertinent field. The present invention can be implemented on the basis of the contents disclosed in the present specification and the common technical knowledge in the pertinent field.

In the below-described drawings, components and parts producing the same action are assigned with same reference numerals, and the redundant explanation thereof is omitted or simplified. The dimensional relationships (length, width, height, etc.) in the drawings do not necessarily reflect actual dimensional relationships.

As depicted in FIG. 1, a positive electrode material 10 disclosed herein has a positive electrode active material particle 12 and a metal hydroxide 14. The positive electrode active material particle 12 constituting the positive electrode material 10 is in a particle shape with a void inside the particle. Further, as depicted in FIG. 1, the metal hydroxide 14 is disposed inside the void of the positive electrode active material particle 12. The positive electrode material 10 disclosed herein can be used in a positive electrode for a nonaqueous electrolyte secondary battery having a positive electrode active material (for example, a positive electrode for a lithium secondary battery), and this positive electrode material can be used in a variety of nonaqueous electrolyte secondary batteries (for example, lithium secondary batteries) having the positive electrode as a constituent element.

The positive electrode active material particle 12 constituting the positive electrode material 10 has a particle shape with a void inside the particle. Such a particle shape typically can be a generally spherical shape or a somewhat distorted spherical shape. Typical examples of the particle shape of a particle having such a void are a particle shape of a hollow structure which has a shell configured of primary particles and a hollow portion (void) formed inside thereof, and a porous structure (sponge-like structure) in which solid portions and void portions are present together across the entire particle. Thus, the positive electrode active material particle of a hollow structure is structurally clearly distinguishable from the positive electrode active material particle of a porous structure in that the solid portion is eccentrically located in the shell, and the large space is clearly formed in the hollow portion. A particle of a typical solid structure can be contrasted against a particle with the shape having such a void.

The case in which the positive electrode active material particle 12 is a particle of a hollow structure will be explained hereinbelow, by way of example, as a preferred embodiment of the positive electrode material 10. However, the present invention is not intended to be limited to such an embodiment. The particle of a hollow structure is an example of the particle shape of the positive electrode active material particles, and the technical concept of the present invention is also applicable to positive electrode active material particles of other shapes (for example, the porous structure).

In the positive electrode active material particle 12 of a hollow structure, the shell is obtained by aggregation of primary particles into a spherical shell shape. In the preferred embodiment, in the observation image of the shell cross section obtained with an electron microscope (for example, a scanning electron microscope (SEM)), the primary particles are disposed annularly (beaded configuration). Here, the primary particle refers to a particle that is considered as a unit particle (ultimate particle) when judged by the external appearance of the geometrical form thereof. In the positive electrode active material particle 12 disclosed herein, the primary particle can have the same composition as that of the positive electrode active material for the conventional nonaqueous electrolyte secondary battery. Typically, the primary particle is an aggregation of crystallites of a lithium transition metal oxide.

The positive electrode active material particle 12 preferably has through holes which spatially connect (communicate) the hollow portion with the exterior (exterior of the particle) through the shell. The positive electrode active material particle 12 of a hollow structure is hereinbelow assumed, unless specifically stated otherwise, to be inclusive of hollow structures having such through holes in the shell. Because of such through holes, the metal hydroxide 14 can be easily disposed inside the hollow portion.

Where the number of the through holes in the positive electrode active material particle 12 is too large, the strength of the active material particle tends to decrease and the hollow structure is often difficult to maintain. For this reason, it is preferred that the average of through holes (the average number of through holes) per one positive electrode active material particle 12 be about 20 or less (for example, 1 to about 10, typically, 1 to 5).

The shape of the positive electrode active material particle 12 (for example, the shape of the hollow portion and shell and the average number of through holes) can be determined, for example, by SEM observations of the cross section of the positive electrode active material particle 12.

In the preferred embodiment, primary particles are sintered to each other through the shell portions other than the through holes. Such a positive electrode active material particle 12 is preferred because it is unlikely to collapse and has high shape retention ability. It is more preferred that the primary particles be densely sintered to each other (generally, at least to a degree such that a typical electrolytic solution cannot pass therebetween, for example, to a degree such that substantially no gaps are present at the boundaries of the primary particles in SEM observations).

The BET specific surface area of the positive electrode active material particle 12 can be, for example, within a range of 0.5 m$^2$/g to 1.9 m$^2$/g (for example, 1.0 m$^2$/g to 1.9 m$^2$/g), although this range is not particularly limiting. Positive electrode active material particles with such a BET specific surface area are preferred because a nonaqueous electrolyte secondary battery equipped with the positive electrode material 10 including such positive electrode active material particles 12 can demonstrate excellent battery performance (for example, a low battery resistance and excellent cycle characteristic). A value measured by a typical nitrogen adsorption method can be used as the specific surface area.

Further, the average particle size of the positive electrode active material particles 12 is not particularly limited and can be, for example, 2 μm or more (preferably, 5 μm or more) and 25 μm or less (typically, 15 μm or less, preferably 10 μm or less). Where the average particle size is too small, the volume of the hollow portions tends to decrease and the thermal stability improvement effect which is demonstrated by the metal hydroxide disposed inside the hollow portions tends to be reduced. Meanwhile, where an attempt is made to ensure the sufficient volume of hollow portions in the positive electrode active material particles 12 with a small particle size, the shell thickness of the active material particle decreases and the strength of the active material particle can decrease. From the standpoint of productivity, etc., of the positive electrode active material particles 12, it is preferred that the average particle size be about 25 μm or less. A value determined by a typical particle size distribution measurement using a laser diffraction method is used as the average particle size of the positive electrode active material particles 12.

Typical positive electrode active materials for nonaqueous electrolyte secondary batteries can be used, without any particular limitation, for the positive electrode active material particles 12 (that is, primary particles constituting the shell of the positive electrode active material particles 12 having the hollow structure) constituting the positive electrode material 10 disclosed herein. For example, a lithium transition metal oxide including lithium (Li) and a transition metal (Me) as constituent metal elements can be used. For example, a material having a spinel-type crystal structure or a layered crystal structure can be used. Examples of layered lithium transition metal oxides include lithium transition metal oxides including at least one metal element selected from a group consisting of nickel (Ni), cobalt (Co), and manganese (Mn) as the transition metal (Me).

The abovementioned lithium transition metal element may further include a transition metal (Mt) other than the Ni, Co, and Mn. Examples of the transition metal (Mt) other than the Ni, Co, and Mn include magnesium (Mg), calcium (Ca), tungsten (W), strontium (Sr), titanium (Ti), zirconium (Zr), vanadium (V), niobium (Nb), chromium (Cr), molybdenum (Mo), iron (Fe), rhodium (Rh), palladium (Pd), platinum (Pt), copper (Cu), zinc (Zn), boron (B), aluminum (Al), gallium (Ga), indium (In), tin (Sn), lanthanum (La), and cerium (Ce).

The average composition represented by General Formula (I) hereinbelow is an exemplary embodiment of the composition of the positive electrode active material particles 12.

$$Li_{1+x}(Ni_aCo_bMn_cMt_d)O_2 \qquad (I)$$

Mt in Formula (I) above is not present or is one or two or more of transition metals (Mt) other than the Ni, Co, and Mn listed hereinabove. Further, x, a, b, c, and d in Formula (I) satisfy the following relationships. Thus, x in the formula, is a value determined such as to fulfill the charge neutrality conditions, and this value satisfies the relationship $0.95 \leq 1+x \leq 1.3$ (for example, $1.1 \leq 1+x \leq 1.2$). Further, a, b, c, and d are such that $a \times b \times c \neq 0$ and $a+b+c+d \approx 1$. In Formula (1), "$a+b+c+d \approx 1$" means that the condition of $0.9 \leq a+b+c+d \leq 1.2$ (typically, $0.95 \leq a+b+c+d \leq 1.1$) is generally fulfilled, for example, $a+b+c+d=1$. Further, a, b, c, and d fulfill the following conditions: $0 \leq a \leq 0.7$, $0 \leq b \leq 0.7$, $0 \leq c \leq 0.7$, $0 \leq d \leq 0.2$. The values of x, a, b, c, and d can change depending on the ratio of the elements.

The preferred example of the aforementioned lithium transition metal oxides is an oxide (LiNiCoMn oxide) including nickel, cobalt, and manganese as the transition metal (Me). For example, a LiNiCoMn oxide is preferred for which in Formula (I) above, the a, b, and c fulfil the conditions $0 < a \leq 0.7$ (for example, $0.3 \leq a \leq 0.5$), $0 < b \leq 0.7$ (for example, 0.3≤b≤0.5), and 0<c≤0.7 (for example, 0.3≤c≤0.5). In another preferred embodiment, the condition of a=b=c=⅓ is fulfilled.

In the positive electrode material 10, as depicted in FIG. 1, one or two or more types of metal hydroxides 14 are disposed in the voids (hollow portions) of the positive electrode active material particles 12. Thermal decomposition of the metal hydroxide 14 is accompanied by an endothermic reaction. As a result, the positive electrode material 10 (positive electrode active material particles 12 constituting the positive electrode material 10, or the positive electrode including the positive electrode material 10) can be prevented from reaching a high-temperature state. Thus, thermal stability of the positive electrode material 10 (positive electrode active material particles 12 constituting the positive electrode material 10, or the positive electrode including the positive electrode material 10) can be increased.

A metal hydroxide with the initiation temperature of the endothermic reaction (referred to hereinbelow as "endothermic initiation temperature"), that is, the temperature at which thermal decomposition of the metal hydroxide is started, for example, from 100° C. (preferably, 200° C. or higher) to 500° C. (typically, 400° C. or less) can be advantageously used as the metal hydroxide 14.

Here, the positive electrode active material (positive electrode active material particles) tends to be unstable when exposed to a high temperature. For example, a change in crystal structure, thermal decomposition, etc., can occur. Further, where the temperature of the nonaqueous electrolyte secondary battery becomes equal to or higher than a predetermined temperature due to overcharging, or the like, the temperature can rise rapidly.

Where a metal hydroxide is used in which the endothermic initiation temperature is too low, thermal decomposition of the metal hydroxide can occur when the nonaqueous electrolyte secondary battery is manufactured (typically, when the positive electrode is fabricated) or in the temperature range of the usual usage of the battery, and the effect of increasing thermal stability due to the presence of the metal hydroxide can hardly be demonstrated. Where the endothermic initiation temperature is too high, it is possible that the temperature region in which the positive electrode active material tends to become unstable, or the temperature region in which the temperature of the nonaqueous electrolyte secondary battery can rise rapidly, will deviate from the temperature region in which the metal hydroxide exerts the endothermic action. Therefore, by using the metal hydroxide in which the endothermic initiation temperature is within the abovementioned range, it is possible to prevent advantageously the positive electrode active material from being unstable, or to prevent advantageously the increase in battery temperature of the nonaqueous electrolyte secondary battery using the positive electrode material.

Hydroxides of various metals can be used, without any particular limitation, as the metal hydroxide 14. Specific examples of metal hydroxides are presented below. Thus, aluminum hydroxide, zinc hydroxide, cadmium hydroxide, chromium hydroxide, cobalt hydroxide, nickel hydroxide, manganese hydroxide, calcium hydroxide, magnesium hydroxide, zirconium hydroxide, and iron hydroxide, can be advantageously used. Among them, aluminum hydroxide ($Al(OH)_3$) is preferred. The aluminum hydroxide is known to be stable and does not undergo thermal decomposition up to a temperature of about 200° C., and thermal decomposition thereof starts at a higher temperature (about 200° C. to 400° C.). Since aluminum hydroxide exerts a strong endothermic action during such thermal decomposition, it can be advantageously used as the metal hydroxide 14.

The amount of the metal hydroxide 14 in the positive electrode material 10 is not particularly limited, but is preferably from 0.1 part by mass to 5 parts by mass per 100 parts by mass of the positive electrode active material particles. Where the amount of the metal hydroxide 14 in the positive electrode material 10 is too small, the thermal stability improving effect which is due to the presence of the metal hydroxide 14 in the positive electrode material 10 cannot be sufficiently demonstrated. Meanwhile, where the amount of the metal hydroxide 14 in the positive electrode material 10 is too large, the capacity of the nonaqueous electrolyte secondary battery constructed using such a positive electrode material 10 can undesirably decrease.

The arrangement of the metal hydroxide 14 in the positive electrode material 10 can be checked by a typical X-ray analysis or an EPMA (Electron Probe Micro Analyzer) analysis. More specifically, the analysis may be performed by exposing the cross section of the positive electrode material 10 by appropriate pre-treatment and observing the obtained cross section with the EPMA. Such a method makes is possible to determine the amount (typically, a relative amount) of the metal hydroxide 14 contained in the positive electrode material 10.

A method for manufacturing the positive electrode material will be explained hereinbelow with respect to, as an example, the case in which the positive electrode active material particles are particles with a hollow structure, and the metal hydroxide is aluminum hydroxide.

Figure 5:
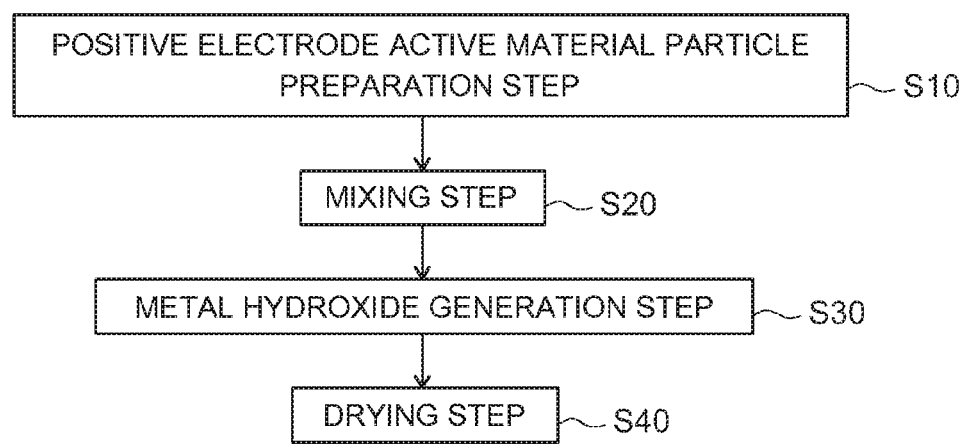
FIG. 5 is a flowchart illustrating the method for manufacturing the positive electrode material according to the embodiment of the present invention.

As depicted in FIG. 5, the method for manufacturing the positive electrode material disclosed herein involves a positive electrode active material particle preparation step (S10), a mixing step (S20), a metal hydroxide generation step (S30), and a drying step (S40). Those steps will be explained hereinbelow in greater detail.

Initially, the positive electrode active material particle preparation step (S10) will be explained. This step involves the preparation of positive electrode active material particles constituting the positive electrode material. Thus, prepared are the positive electrode active material particles which can reversibly store and release a charge carrier and which have a void inside each particle (in this case, positive electrode active material particles with a hollow structure which has a shell configured of primary particles and a hollow portion formed inside the shell). The particles (in this case, positive electrode active material particles with a hollow structure which has a shell configured of primary particles and a hollow portion formed inside the shell) can be used, without any particular limitation, as the positive electrode active material particles.

The positive electrode active material particles having a void inside each particle (particles with a hollow structure) can be fabricated by a well-known conventional method.

For example, as an embodiment of a method for fabricating positive electrode active material particles with a hollow structure configured of a lithium transition metal oxide, a method can be used by which the hydroxide of a transition metal is precipitated (a starting material hydroxide is generated) under suitable conditions from an aqueous solution including at least one (preferably, all of the metal elements other than lithium that are included in the lithium transition metal oxide) transition metal element other than lithium contained in the lithium transition metal oxide constituting the positive electrode active material particles, the resulting starting material hydroxide is mixed with a lithium compound, and the mixture is fired. In this case, the generation of the starting material hydroxide may involve a nucleation step of precipitating the transition metal hydroxide from the aqueous solution under the conditions of a pH being 12 or more and an ammonium ion concentration being 25 g/L or less; and a particle growth step of growing the precipitated transition metal hydroxide under the conditions of a pH being less than 12 and an ammonium ion concentration being 3 g/L or more. The firing may be performed such that the maximum firing temperature is 800° C. to 1100° C. With such a manufacturing method, the positive electrode active material particles having a hollow structure can be advantageously manufactured.

Further, an exemplary embodiment of fabricating the positive electrode active material particles with the porous structure which are configured of a lithium transition metal oxide can be a fabrication, for example, by spray drying (the so-called spray drying process) a slurry including at least one (preferably, all) of the lithium and transition metal elements constituting the positive electrode active material particles, and then firing.

Since the method for fabricating the positive electrode active material particles does not specify the present invention, the detailed explanation thereof is herein omitted.

The mixing step (S20) is explained hereinbelow. This step involves mixing the positive electrode active material particles prepared in the positive electrode active material particle preparation step (S10) with a predetermined metal salt. The mixing method is not particularly limited, provided that the positive electrode active material particles and the predetermined metal salt can be mixed. For example, a method using a well-known mixing device such as a mixer, a blender, a mill, or a kneader can be used.

The predetermined metal salt, as referred to herein, is the salt of a metal element (in this case, aluminum) that constitutes the metal hydroxide (aluminum hydroxide) which is to be disposed in the voids (in this case, hollow portions) of the positive electrode active material particles.

The predetermined metal salt is not particularly limited, provided that it can generate a metal hydroxide in the below-described metal hydroxide generation step (S30). The metal hydroxide typically can be generated by reduction in a basic aqueous solvent (typically, water). An anion capable of generating the desired metal hydroxide in the course of a redox reaction may be selected, as appropriate, as an anion in the predetermined meal salt. Examples of suitable anions include a sulfuric acid ion, a nitric acid ion, a chloride ion, and a carbonic acid ion. Thus, the predetermined metal salt can be a sulfate, nitrate, chloride, carbonate and the like of the metal element constituting the metal hydroxide which is to be disposed in the voids (in this case, hollow potions) of the positive electrode active material particles. Those salts may be respective solvates such as hydrates.

The mixing ratio of the positive electrode active material particles and the metal salt may be set, as appropriate, such as to obtain the desired ratio of the positive electrode active material particles and metal hydroxide in the positive electrode material. For example, the metal salt may be mixed at a ratio of about 0.4 part by mass to 20 parts by mass per 100 parts by mass of the positive electrode active material particles. The mixing ratio of the positive electrode active material particles and the metal salt can change depending on the composition of the positive electrode active material particles and the type of the metal salt.

Next, the metal hydroxide generation step (S30) will be explained hereinbelow. This step involves inducing a redox reaction by using moisture contained in the air or added moisture, thereby reducing the metal salt and generating the hydroxide of the metal, and then arranging the metal hydroxide at least in the voids (in this case, hollow portions) of the positive electrode active material particles.

Where the moisture contained in the air adheres to the surface of the positive electrode active material particles, or the added moisture comes into contact with the positive electrode active material particles, the moisture forms a basic aqueous solution. The predetermined metal salt is reduced in the basic aqueous solution, thereby generating a metal hydroxide.

The predetermined metal salt which has been mixed with the positive electrode active material particles in the mixing step (S20) is typically present on the exterior of the positive electrode active material particles (exterior of the particles). Therefore, the predetermined metal salt is reduced and an aqueous solution including the metal hydroxide is generated on the outer surface of the positive electrode active material particles (the surface of the positive electrode active material particles which is in contact with the outside; same hereinbelow). The metal hydroxide contained in the aqueous solution is typically disposed in the voids inside the particles (typically, inside hollow portions present on the inner side of the shells) via the holes (typically, through holes present in the shells of the positive electrode active material particles) communicating with the exterior of the positive electrode active material particles.

Where an excess amount of moisture comes into contact with the positive electrode active material particles, the amount of the metal hydroxide disposed in the voids (in this case, hollow portions) of the positive electrode active material particles tends to decrease, and the amount of metal hydroxide disposed on the exterior (typically, on the outer surface) of the positive electrode active material particles tends to increase. Thus, in order to dispose the metal hydroxide in the voids (in this case, hollow portions) of the positive electrode active material particles in the fabrication of the positive electrode material, it is important to generate an aqueous solution including the metal hydroxide at a high concentration on the outer surface of the positive electrode active material particles. It is not required to explain how a positive electrode material in which the metal hydroxide is disposed in the voids (in this case, in the hollow portions) of the positive electrode active material particles can be obtained by reducing the amount of moisture that comes into contact with the surface of the positive electrode active material particles when fabricating the positive electrode material which is disclosed herein, but for example the following reason therefor can be suggested. For example, the moisture contained in the air or added moisture can adhere both to the outer surface and inner surface (the surface that is in contract with the voids inside the positive electrode active material particles; same hereinbelow) of the positive electrode active material particles, but as a result of the predetermined metal salt being present on the exterior of the positive electrode active material particles, a difference occurs between the concentrations of metal hydroxide in the aqueous solutions generated on the outer surface and inner surface of the positive electrode active material particles, and the metal hydroxide can be effectively disposed in the voids (in this case, in the hollow portions) of the positive electrode active material particles by using this difference in concentration.

In the preferred embodiment, the metal salt is reduced by using moisture contained in the air. For example, it is preferred that the moisture contained in the air be brought into contact with the surface of the positive electrode active material particles, and a basic aqueous solution be generated on the positive electrode active material particle surface by placing the mixture of the positive electrode active material particles and the metal salt under a high-humidity atmosphere. For example, the metal hydroxide can be advantageously disposed in the voids (in this case, in the hollow portions) of the positive electrode active material particles by allowing the mixture of the positive electrode active material particles and the metal salt to stay under an environment with a relative humidity of 80% (80% RH) or higher (preferably, 90% (90% RH) or higher). The mixture may be allowed to stay under such a high-humidity atmosphere, for example, for 20 hours or longer (preferably, 24 hours or longer), but this interval of time is not limiting.

The temperature conditions in the metal hydroxide generation step (S30) are not particularly limited, and the temperature can be, for example, 40° C. or higher (typically, 50° C. or higher) and 90° C. or lower (typically, 80° C. or lower). By setting the temperature conditions within this range, it is possible to advance effectively the redox reaction of the predetermined metal salt, or to dispose effectively the metal hydroxide in the voids (in this case, in the hollow portions) of the positive electrode active material particles. It is undesirable that the temperature be too high, because the metal hydroxide can decompose.

The drying step (S40) will be explained hereinbelow. This step involves removing, by drying, the excess moisture contained in the positive electrode active material particles in which the metal hydroxide has been disposed in the voids (in this case, in the hollow portions) in the metal hydroxide generation step (S30). The drying method is not particularly limited, and the well-known conventional drying methods such as hot-air drying and reduced-pressure drying (vacuum drying) can be used.

It is undesirable that the drying temperature be too high, because the metal hydroxide in the voids (in this case, in the hollow portions) can be thermally decomposed. Therefore, from the standpoint of demonstrating high thermal stability improvement effect which is due to the inclusion of the metal hydroxide into the positive electrode material (in the voids of the positive electrode active material particles), it is preferred that the drying be performed at a temperature (for example, less than 200° C., typically 150° C. or less) lower than the thermal decomposition temperature of the metal hydroxide. From the standpoint of drying efficiency, it is preferred that the drying be performed at a temperature of 80° C. or higher, for example, at about 100° C.

An embodiment of the nonaqueous electrolyte secondary battery using the positive electrode material disclosed herein will be explained hereinbelow with reference, as appropriate, to the appended drawings. A lithium secondary battery will be explained hereinbelow in detail as the preferred embodiment of the nonaqueous electrolyte secondary battery, but the present invention is not intended to be limited to this embodiment. The lithium secondary battery is merely an example, and the technical idea of the present invention can be also used in other nonaqueous electrolyte secondary batteries (for example, a sodium secondary battery) having other charge carriers (for example, sodium ions).

The "secondary battery" as referred to in the present specification is a term generally representing a battery capable of repeated charging and discharging and is inclusive of the so-called chemical batteries such as a lithium secondary battery, a sodium secondary battery, and a nickel hydrogen secondary battery and also physical batteries such as a double-layer electric capacitor. Further, the "lithium secondary battery", as referred to in the present specification, is a secondary battery which uses lithium ions as charge carriers (support salt, support electrolyte) and is charged and discharged by the movement of lithium ions between positive and negative electrodes.

The lithium secondary battery disclosed herein includes a positive electrode, a negative electrode, and a nonaqueous electrolyte. An electrode body having the positive electrode and negative electrode and the nonaqueous electrolyte are typically accommodated in an outer case (typically, a battery case). The shape of the outer case (typically, a battery case) is not particularly limited, and the outer case can be bag-like, cylindrical, or cubical (box-like). The configuration of the electrode body is not particularly limited and can be a stack-type electrode body (stacked electrode body) or a wound-type electrode body (wound electrode body).

A battery configured such that a wound electrode body 20 is accommodated in a battery case 30 of a rectangular parallelepiped shape will be explained hereinbelow in a simple manner by way of example as the preferred embodiment of the lithium secondary battery disclosed herein.

Figure 2:
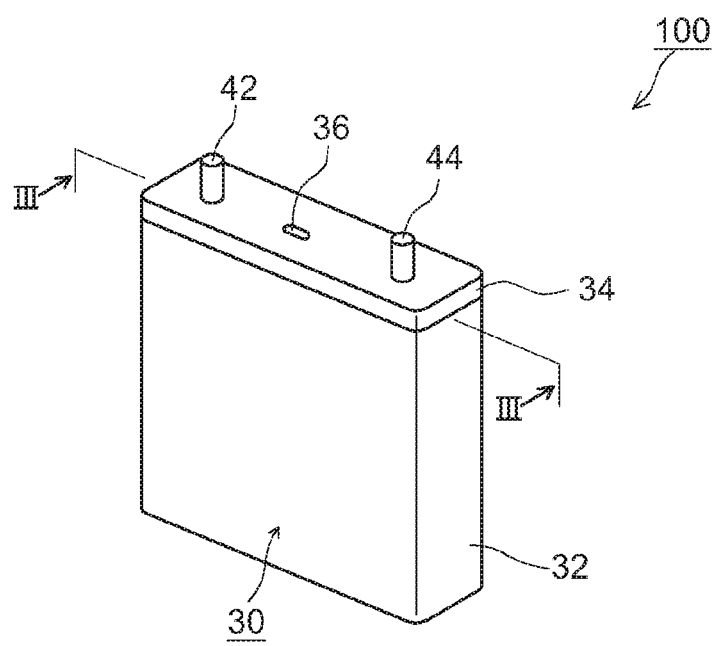
FIG. 2 is a perspective view illustrating schematically the outer shape of the nonaqueous electrolyte secondary battery according to the embodiment.
Figure 3:
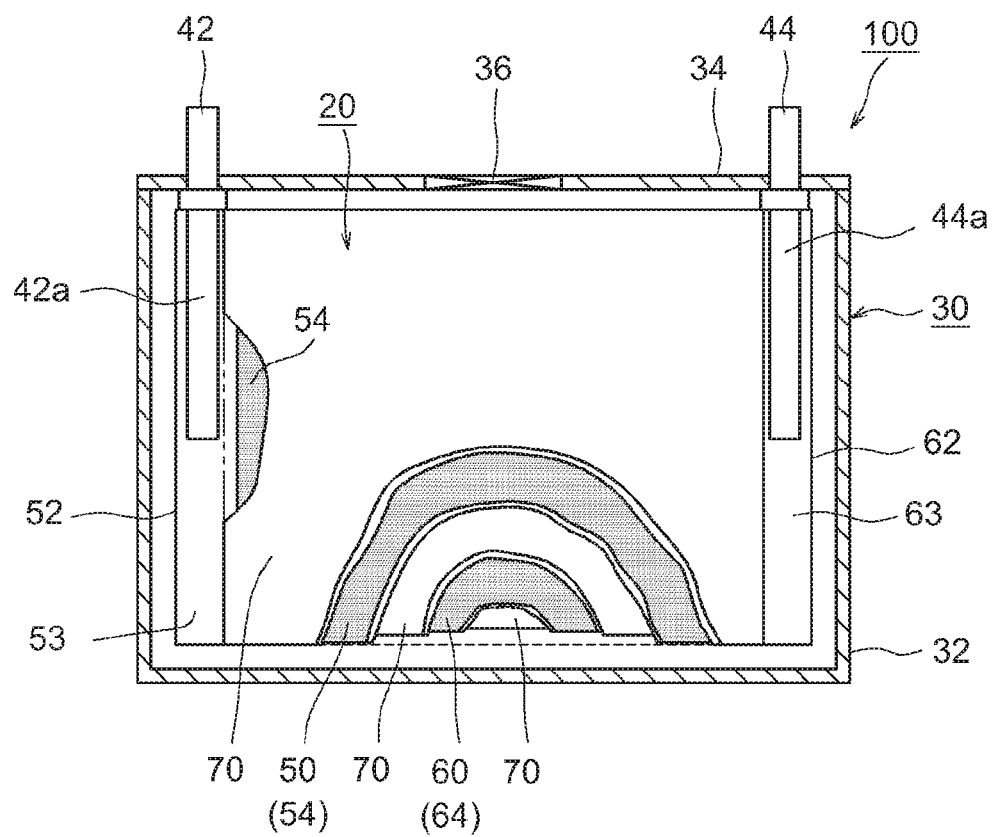
FIG. 3 is a vertical sectional view along the III-III line in FIG. 2.

As depicted in FIGS. 2 and 3, the battery case 30 can be configured of a case main body 32 of a bottomed flat box-like shape (typically, in the form of a rectangular parallelepiped) having an opening at one end (corresponds to the upper end in the usual usage state of the battery), and a lid 34 closing the opening of the case main body 32. As depicted in the figures, a positive electrode terminal 42 and a negative electrode terminal 44 for external connection are provided to the lid 34 so that one end of each terminal protrudes from the lid 34 to the outside of the battery 100. The lid 34 is also provided with a safety valve 36 which has been set to release the internal pressure of the battery case, and a pouring port (not depicted in the figures) for pouring a nonaqueous electrolyte into the battery case. The battery case is preferably made, for example, of a lightweight metal material (for example, aluminum) having good thermal conductivity.

Figure 4:
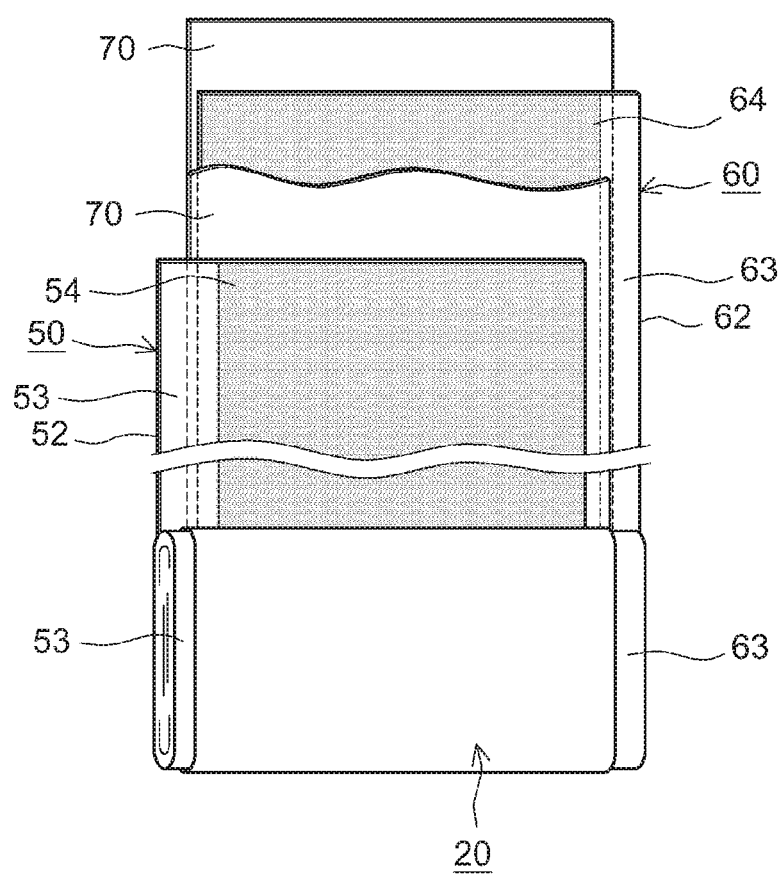
FIG. 4 is a schematic view illustrating the configuration of a wound electrode body according to the embodiment.

As depicted in FIGS. 3 and 4, the wound electrode body 20 is obtained by laminating (stacking) a positive electrode 50 in which a positive electrode active material layer 54 is formed along the longitudinal direction on one or both surfaces (in this case, on both surfaces) of an elongated positive electrode collector 52, and a negative electrode 60 in which a negative electrode active material layer 64 is formed along the longitudinal direction on one or both surfaces (in this case, on both surfaces) of an elongated negative electrode collector 62, with two elongated separators 70 being interposed therebetween, and then winding the laminate in the longitudinal direction. Such a flat-shaped wound electrode body 20 can be formed, for example, by laminating the positive electrode 50, the negative electrode 60, and the separators 70, winding the laminate, and then squashing (pressing) and flattening out the wound body in one direction (typically, from the side direction) perpendicular to the winding axis.

As depicted in FIGS. 3 and 4, the wound electrode body 20 is obtained by winding the positive electrode and negative electrode which are laminated with a certain displacement in the width direction such that a positive electrode collector exposed end portion 53 (that is, a portion where the positive electrode active material layer 54 is not formed and the positive electrode collector 52 is exposed) and a negative electrode collector exposed end portion 63 (that is, a portion where the negative electrode active material layer 64 is not formed and the negative electrode collector 62 is exposed) protrude to the outside from both ends in the winding axis direction, but such a configuration is not particularly limiting. As a result, a wound core in which the positive electrode 50, the negative electrode 60, and the separators 70 are laminated and wound is formed in the central portion, in the winding axis direction, of the wound electrode body 20. Further, as depicted in FIG. 3, in the positive electrode 50 and the negative electrode 60, the positive electrode collector exposed end portion 53 and the positive electrode terminal 42 (for example, made of aluminum) can be electrically connected through a positive electrode current collector plate 42a, and the negative electrode collector exposed end portion 63 and the negative electrode terminal 44 (for example, made of nickel) can be electrically connected through a negative electrode current collector plate 44a. The positive and negative electrode current collector plates 42a, 44a and the positive and negative electrode collector exposed end portions 53, 63 (typically, the positive and negative electrode collectors 52, 62) can be respectively joined to each other, for example, by ultrasonic welding or resistance welding.

In the lithium secondary battery 100 disclosed herein, the wound electrode body 20 can be accommodated in the case main body 30 in a posture such that the winding axis of the wound electrode body 20 is sideways (that is, the opening is formed in the direction normal to the winding axis of the wound electrode body 20). For example, the wound electrode body 20 can be accommodated inside the battery case main body 32 from the opening of the battery case main body 32, and the opening of the case main body 32 can be thereafter closed by the lid 34, thereby accommodating the wound electrode body 20 inside the battery case 30. The lid 34 and the case main body 32 may be joined by welding, or the like.

The positive electrode 50 includes the positive electrode collector 52 and the positive electrode active material layer 54 which includes at least the positive electrode material 10 (that is, the positive electrode material in which the metal hydroxide 14 is disposed inside the voids of the positive electrode active material particles 12) and which is formed on one or both surfaces of the positive electrode collector 52. For example, an aluminum foil can be advantageously used as the positive electrode collector 52.

The positive electrode active material layer 54 can also include components other than the positive electrode material 10, for example, an electrically conductive material and a binder. A carbon black such as acetylene black or other carbon materials (graphite, etc.) can be advantageously used as the electrically conductive material. PVdF and the like can be used as the binder. The amount of the positive electrode material in the positive electrode active material layer can be set such that ratio of the positive electrode active material in the positive electrode active material layer exceeds about 50% by mass and is within a range of about 90% by mass to 99% by mass (for example, 95% by mass to 99% by mass, typically 97% by mass to 99% by mass).

Such a positive electrode 50 can be formed, for example, by dispersing the positive electrode material 10 (that is, the positive electrode material in which the metal hydroxide 14 is disposed in the voids of the positive electrode active material particles 12) and an material, used when optionally required, in an appropriate solvent (for example, N-methyl-2-pyrrolidone), preparing a paste-like (slurry-like) composition, applying the appropriate amount of the composition to the surface of the positive electrode collector 52, and then drying. If optionally required, the properties (for example, average thickness, active material density, porosity, and the like) of the positive electrode active material layer 54 can be adjusted by performing the appropriate press processing.

The negative electrode 60 includes the negative electrode collector 62 and the negative electrode active material layer 64 which includes at least the negative electrode active material and is formed on one or both surfaces of the negative electrode collector 62. For example, a copper foil can be advantageously used as the negative electrode collector 62.

One or two or more substances which have been conventionally used in lithium ion batteries can be used, without any particular limitation, as the negative electrode active material. For example, a carbon material having a graphite structure (layered structure) in at least part thereof and a lithium transition metal nitride can be used. The so-called graphite-like materials (graphite), hardly graphitizable carbonaceous material (hard carbon), easily graphitizable carbonaceous material (soft carbon), and carbon materials having a combined structure thereof can be advantageously used. Among them, it is particularly preferred that graphite particles of natural graphite be used. Carbon particles in which amorphous carbon is applied to the surface of graphite may be also used.

The negative electrode active material layer 64 can include, for example, a binder and a thickening agent in addition to the active material. A styrene-butadiene rubber (SBR) can be used as the binder. For example, carboxymethyl cellulose (CMC) can be used as the thickening agent. The amount of the negative electrode active material in the negative electrode active material layer 64 can be above about 50% by mass, more specifically about 90% by mass to 99% by mass (for example, 95% by mass to 99% by mass, typically 97% by mass to 99% by mass).

Such a negative electrode 60 can be formed, for example, by dispersing the negative electrode active material and a material, used when optionally required, in an appropriate solvent (for example, water), preparing a paste-like (slurry-like) composition, applying the appropriate amount of the composition to the surface of the negative electrode collector 62, and then drying. If necessary, the properties (for example, average thickness, active material density, porosity, and the like) of the negative electrode active material layer 64 can be adjusted by performing the appropriate press processing.

Well-known conventional materials can be used, without any particular limitation, for the separator 70. For example, a porous sheet (film) configured of a resin such as polyethylene (PE), polypropylene (PP), polyesters, cellulose, and polyamides can be used. The porous sheet may have a monolayer structure or a laminated structure including two or more layers (for example, a three-layer structure in which PP layers are laminated on both surfaces of a PE layer).

The form of the nonaqueous electrolyte is not particularly limited, and it can be in a liquid, gel-like, or solid form. Typically, a nonaqueous electrolytic solution can be used in which a support salt is contained in an organic solvent (nonaqueous solvent). Such a nonaqueous electrolytic solution is in a liquid state at a normal temperature (for example, 25° C.), and in a preferred embodiment, it is in a liquid state at all times under the battery usage environment (for example, the environment with a temperature of 0° C. to 60° C.).

Various organic solvents such as carbonates, ethers, esters, nitriles, sulfones, and lactones, which are used for the electrolytic solution of a typical lithium secondary battery, can be used as the nonaqueous solvent. Specific examples include ethylene carbonate (EC), propylene carbonate (PC), diethyl carbonate (DEC), dimethyl carbonate (DMC), and ethyl methyl carbonate (EMC). Such nonaqueous solvents can be used individually or in an appropriate combination of two or more thereof. Among them, EC which has a high specific dielectric constant and DMC or EMC which has a high oxidation potential (a wide potential window) can be advantageously used.

A support salt same as that of the typical lithium secondary battery can be used. Examples thereof include lithium salts such as $LiPF_6$, $LiBF_4$, $LiClO_4$, and $LiAsF_6$ (preferably $LiPF_6$). Such support salts can be used individually or in an appropriate combination of two or more thereof. The preferred concentration range of the support salt in the nonaqueous electrolyte can be 0.7 mol/L to 1.3 mol/L (for example, 1.1 mol/L).

A component (an additive) other than the nonaqueous solvent and support salt can be included in the nonaqueous electrolyte, provided that the effect of the present invention is not significantly impaired. Examples of such additives include film-forming agents, gas-generating agents, dispersants, and thickening agents.

The positive electrode material disclosed herein excels in thermal stability. Therefore, such a positive electrode material is suitable for nonaqueous electrolyte secondary batteries for a variety of applications, and can be advantageously used, by making use of such a property, as a positive electrode material for nonaqueous electrolyte secondary batteries to be used as drive power sources installed on vehicles. The vehicle type is not particularly limited, and examples of suitable vehicles include plug-in hybrid vehicles (PHV), hybrid vehicles (HV), electric vehicle (EV), electric trucks, motor bikes, power-assisted bicycles, electric wheelchairs, and electric trains.

By using such a positive electrode material, it is possible to provide a nonaqueous electrolyte secondary battery with excellent thermal stability, or a vehicle using the nonaqueous electrolyte secondary battery preferably as a power source.

Several examples (test examples) relating to the present invention will be explained hereinbelow, but the present invention is not intended to be limited to those specific examples.

[Fabrication of Positive Electrode Material]

Positive electrode materials according to Examples 1 to 13 were fabricated by using the following materials and processes.

EXAMPLE 1

Initially, positive electrode active material particles with a hollow structure that had a shell configured of primary particles, and a hollow portion formed inside each shell were prepared. The composition of the positive electrode active material particles is represented by $Li_{1.15}Ni_{0.33}Co_{0.33}Mn_{0.33}O_2$.

Then, 0.4 part by mass of aluminum sulfate 16-hydrate was mixed with 100 parts by mass of the positive electrode active material particles prepared in the above-described manner, the mixture was held for 24 h under the environment with a relative humidity of 90% (90% RH) and a temperature of 60° C. and then vacuum dried at 100° C. A positive electrode material (Example 1) in which aluminum hydroxide was disposed inside the hollow portions of the positive electrode active material particles was thus obtained. The amount of the aluminum hydroxide in the positive electrode material was 0.1 part by mass per 100 parts by mass of the positive electrode active material particles.

EXAMPLEs 2 TO 6

Positive electrode materials of Examples 2 to 6 were obtained by using the same materials and processes as in Example 1, except that the mixing ratio of the positive electrode active material particles and aluminum sulfate 16-hydrate was changed as indicated in Table 1. The value of the aluminum sulfate 16-hydrate indicated in Table 1 represents the mixing ratio (parts by mass) of the aluminum sulfate 16-hydrate when the amount of the positive electrode active material particles is taken as 100 parts by mass.

TABLE 1

| Example | Aluminum sulfate (parts by mass) |
|---|---|
| 1 | 0.4 |
| 2 | 2 |
| 3 | 4 |
| 4 | 8 |
| 5 | 12 |
| 6 | 20 |

EXAMPLE 7

The positive electrode active material particles used in the positive electrode material according to Example 1 were used, without any change, as the positive electrode material according to Example 7 (that is, no aluminum hydroxide was included).

EXAMPLE 8

The positive electrode active material particles same as those in Example 1 were prepared. Then, 13 parts by mass of an aqueous solution of aluminum sulfate 16-hydrate with a concentration of 3% by mass was mixed with 100 parts by mass of the positive electrode active material particles, and the mixture was then vacuum dried at 100° C. A positive electrode material (Example 8) in which aluminum hydroxide was disposed on the exterior (typically, on the outer surface) of the positive electrode active material particles was obtained.

EXAMPLEs 9 TO 13

Positive electrode materials of Examples 9 to 13 were obtained by using the same materials and processes as in Example 8, except that the mixing ratio of the positive electrode active material particles and the aqueous solution of aluminum sulfate 16-hydrate with a concentration of 3% by mass was changed as indicated in Table 2. The value of the aqueous solution of aluminum sulfate indicated in Table 2 represents the mixing ratio (parts by mass) of the aqueous solution of aluminum sulfate 16-hydrate (3% by mass) when the amount of the positive electrode active material particles is taken as 100 parts by mass.

TABLE 2

| Example | A aqueous solution of aluminum sulfate (parts by mass) |
|---|---|
| 8 | 13 |
| 9 | 67 |
| 10 | 135 |
| 11 | 269 |

TABLE 2-continued

| Example | A aqueous solution of aluminum sulfate (parts by mass) |
|---|---|
| 12 | 404 |
| 13 | 673 |

For the positive electrode materials of the examples that were fabricated in the above-described manner, the amount of aluminum hydroxide in the positive electrode material is shown in the respective column of Table 3 as the ratio (parts by mass) to 100 parts by mass of the positive electrode active material particles.

The positive electrode materials of the examples that were fabricated in the above-described manner were investigated by an X-ray diffraction method, and peaks of aluminum hydroxide were detected for the positive electrode materials of Examples 1 to 6 and Examples 8 to 13. For the positive electrode material of Example 7, no peak of aluminum hydroxide was detected. The positive electrode materials of the examples were also investigated by the EPMA line analysis of the cross section thereof. For the positive electrode materials of Examples 1 to 6, the presence of aluminum hydroxide in the hollow portions of the positive electrode active material particles was confirmed. Meanwhile, for the positive electrode materials of Examples 8 to 13, the presence of aluminum hydroxide on the exterior (outer surface) of the positive electrode active material particles was confirmed.

Those results have confirmed that the method disclosed herein makes it possible to fabricate a positive electrode material in which aluminum hydroxide is disposed in the hollow portions of the positive electrode active material particles.

[Construction of Nonaqueous Electrolyte Secondary Battery (Lithium Secondary Battery)]

Lithium secondary batteries of Examples 1 to 13 were constructed by using the positive electrode materials of Examples 1 to 13 fabricated in the above-described manner. The lithium secondary batteries of Examples 1 to 13 were fabricated by using the same materials and processes, except that the positive electrode materials of the aforementioned examples were used.

A paste-like (slurry-like) composition for forming a positive electrode active material layer was prepared by mixing one of the positive electrode materials of Examples 1 to 13, which had been fabricated in the above-described manner, acetylene black (AB) as an electrically conductive material, and polyvinylidene fluoride (PVdF) as a binder at a mass ratio of the positive electrode material: AB:PVdF=100:13:13 with N-methyl pyrrolidone (NMP). The composition was stripe-like coated on both surface of an elongated aluminum foil (positive electrode collector), dried, and pressed to fabricate a positive electrode.

A paste-like (slurry-like) composition for forming a negative electrode active material layer was prepared by dispersing graphite (C) as a negative electrode active material, a styrene-butadiene rubber (SBR) as a binder, and carboxymethyl cellulose (CMC) as a thickening agent at a mass ratio of C:SBR:CMC=98:1:1 in water. The composition was stripe-like coated on both surface of an elongated copper foil (negative electrode collector), dried, and pressed to fabricate a negative electrode.

A flat-shaped wound electrode body was then fabricated by longitudinally laminating the positive electrode and negative electrode, which had been fabricated by the above-described method, with two separators of a three-layer structure in which a porous polypropylene layer was formed on both surfaces of a porous polyethylene layer, winding the laminate in the longitudinal direction, and then squashing and flattening out the resultant.

The wound electrode body and a nonaqueous electrolyte were then accommodated inside an angular battery case (made of aluminum), thereby constructing batteries of Examples 1 to 13. The nonaqueous electrolyte was prepared by dissolving $LiPF_6$ as a support salt to a concentration of 1 mol/L in a mixed solvent including ethylene carbonate (EC), dimethyl carbonate (DMC), and ethyl methyl carbonate (EMC) at a volume ratio of EC:DMC:EMC=1:1:1.

[Thermal Stability Evaluation Test]

The maximum battery temperature attained during charging under predetermined conditions was investigated for the batteries according to Examples 1 to 13 constructed in the above-described manner. The specific procedure is described hereinbelow.

Initially, the batteries of the examples were adjusted to a charged state of SOC (state of charge) of 60%, and a thermocouple (temperature sensor) was pasted on the outer surface of the battery case of each battery. The battery of each example was then constant-current charged (CC charged) at a charging rate of ⅓C (constant current) under a temperature environment of 25° C. till the voltage between the positive and negative electrode terminals reached 5.0 V. The constant-voltage charging (CV charging) was then performed till the total charging time reached 2.0 hours, and the batteries were allowed to rest for 1 min. In this case, the battery temperature (° C.) from the start of the constant-current charging to the end of the 1-min rest period was measured for each battery with the thermocouple (temperature sensor) pasted on the outer surface of the battery case. Then, the maximum reached temperature (° C.) measured within the measurement period of time (constant-current charging to rest period) was determined for each battery. As for the maximum reached temperature (° C.) of the battery of each example, the maximum reached temperature (° C.) of the battery of each example in the case in which the maximum reached temperature of the battery of Example 7 was taken as 0° C. was calculated by the following formula:

Maximum reached temperature (° C.)=(Maximum reached temperature (° C.) of battery of each example)−(Maximum reached temperature (° C.) of the battery of Example 7).

Figure 6:
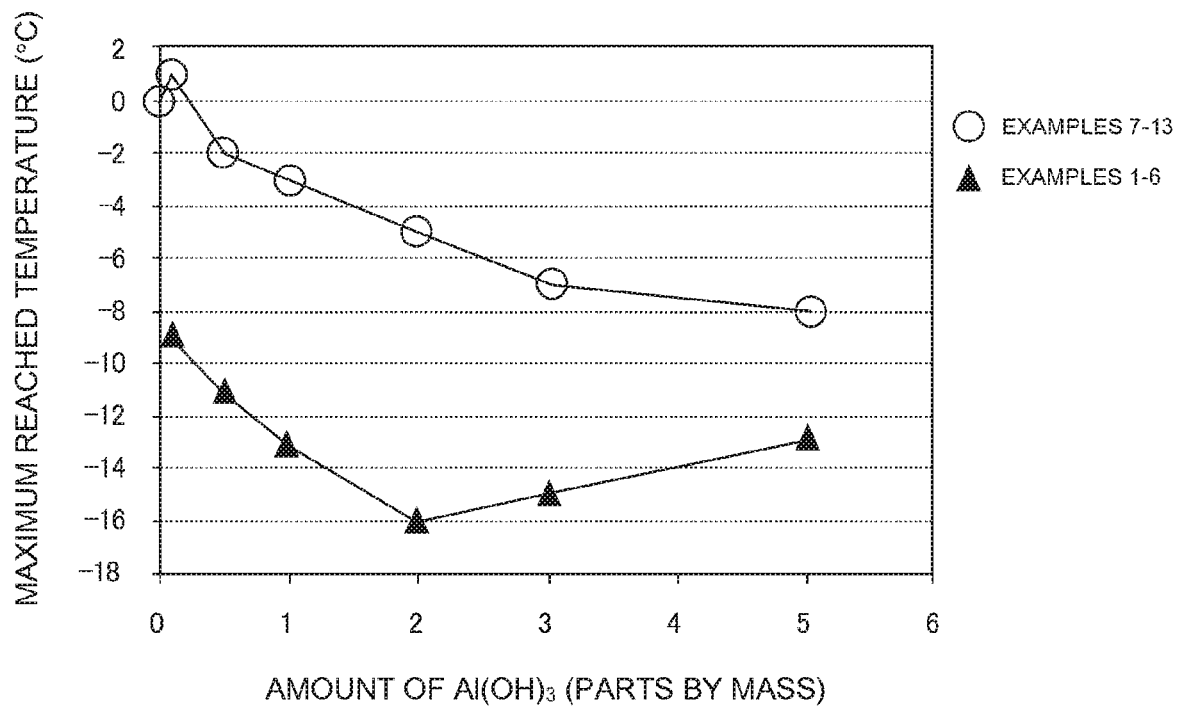
FIG. 6 is a graph representing the relationship between the maximum temperature (° C.) reached when a nonaqueous electrolyte secondary battery constructed using the positive electrode active material according to the example is charged and the amount of metal oxide (in this case, aluminum hydroxide) contained in the positive electrode active material.

The results are shown in the "Maximum reached temperature (° C.)" column in Table 3 and in FIG. 6.

If not stated otherwise, the "SOC" (State of Charge), as referred to herein, is the state of charge of the battery which is based on the voltage range in which the battery is normally used. For example, it is a state of charge based on the rated capacity measured under the condition of the inter-terminal voltage (open-circuit voltage (OCV)) being 4.1 V (upper limit voltage) to 3.0 V (lower limit voltage).

Further, "1 C" means a current value at which the battery capacity (Ah) predicted from the theoretical capacity can be charged in 1 hour. For example, 1 C=24 A when the battery capacity is 24 Ah.

TABLE 3

| Example | Amount of Al(OH)$_3$ (parts by mass) | Maximum reached temperature (° C.) |
|---|---|---|
| 1 | 0.1 | −9 |
| 2 | 0.5 | −11 |
| 3 | 1 | −13 |
| 4 | 2 | −16 |
| 5 | 3 | −15 |
| 6 | 5 | −13 |
| 7 | 0 | 0 |
| 8 | 0.1 | 1 |
| 9 | 0.5 | −2 |
| 10 | 1 | −3 |
| 11 | 2 | −5 |
| 12 | 3 | −7 |
| 13 | 5 | −8 |

As indicated in Table 1, in the nonaqueous electrolyte secondary batteries of Examples 1 to 6, heat generation during charging is greatly suppressed as compared with the nonaqueous electrolyte secondary battery of Example 7. Further, in the nonaqueous electrolyte secondary batteries of Examples 1 to 6, heat generation during charging was suppressed as compared with the nonaqueous electrolyte secondary batteries of Examples 8 to 13 which had the same amount of metal hydroxide (aluminum hydroxide) in the positive electrode material. Thus, it was confirmed that in the positive electrode material having a metal hydroxide in the voids (in this case, in the hollow portions of positive electrode active material particles with a hollow structure) of the positive electrode active material particles having the void in each particle, heat generation in the positive electrode during charging could be greatly suppressed. In other words, the nonaqueous electrolyte secondary batteries using the positive electrode having such a positive electrode material excelled in thermal stability.

The amount of the metal hydroxide in the positive electrode active material is not particularly limited, but it was confirmed that the positive electrode material including the metal hydroxide in an amount from 0.1 part by mass to 5 parts by mass per 100 parts by mass of the positive electrode active material particles could demonstrate a high thermal stability improving effect.

The present invention is explained hereinabove in detail, but the embodiments and examples thereof are merely exemplary, and the invention disclosed herein is inclusive of various changes and modifications of the specific examples.

What is claimed is:

1. A positive electrode material for use in a nonaqueous electrolyte secondary battery, the positive electrode material comprising:
    positive electrode active material particles that can reversibly store and release a charge carrier; and
    a metal hydroxide, wherein
    each of the positive electrode active material particles has inside thereof a void,
    the positive electrode active material particles are particles of a lithium transition metal oxide including lithium (Li) and a transition meta (Me) as constituent metal elements, and
    the metal hydroxide is disposed only inside the void.

2. The positive electrode material according to claim 1, wherein
    each of the positive electrode active material particles has a hollow structure having a shell configured of primary particles and a hollow portion formed inside thereof; and
    the metal hydroxide is disposed in the hollow portion.

3. The positive electrode material according to claim 1, wherein the metal hydroxide is included in the positive electrode material in an amount from 0.1 part by mass to 5 parts by mass per 100 parts by mass of the positive electrode active material particles.

4. The positive electrode material according to claim 1, wherein aluminum hydroxide is included as the metal hydroxide.

5. The positive electrode material according to claim 1, wherein the transition metal the lithium transition metal oxide includes at least nickel, cobalt, and manganese.

6. A method for manufacturing the positive electrode material according to claim 1, the method comprising:
    preparing positive electrode active material particles that can reversibly store and release a charge carrier, each of the positive electrode active material particles having a void inside the particle;
    mixing the positive electrode active material particles with a predetermined metal salt;
    reducing the metal salt and generating a hydroxide of the metal by inducing a redox reaction by using moisture in air or added moisture, and disposing the metal hydroxide at least inside the voids of the positive electrode active material particles; and
    removing excess moisture by drying the positive electrode active material particles in which the metal hydroxide has been disposed only inside the voids.

* * * * *